United States Patent [19]

Tarnopol et al.

[11] 3,732,792

[45] May 15, 1973

[54] IMAGE PLANE PLATE

[75] Inventors: Milson S. Tarnopol, Brackenridge; Robert G. Twells, deceased, late of New Kensington, both of Pa. by Dolores A. Twells, administratrix; Ronald R. Rigby, Ridgefield, Conn.

[73] Assignee: PPG Industries, Inc., Pittsburgh, Pa.

[22] Filed: Dec. 14, 1970

[21] Appl. No.: 97,749

Related U.S. Application Data

[63] Continuation-in-part of Ser. No. 671,830, Sept. 29, 1967, abandoned.

[52] U.S. Cl. .........................95/1 R, 96/38.3, 156/15, 96/36, 117/124 B

[51] Int. Cl. .................G03, G03c 5/00, C03c 17/00

[58] Field of Search ................................96/36.2, 34; 117/124 B; 65/30; 156/15; 95/1 R

[56] References Cited

UNITED STATES PATENTS

| | | | |
|---|---|---|---|
| 3,468,745 | 9/1969 | Navez et al. | 161/164 |
| 3,561,963 | 2/1971 | Kiba | 96/36.2 |
| 2,927,042 | 3/1960 | Hall et al. | 65/30 |
| 3,370,948 | 2/1968 | Rosenbauer | 156/15 |
| 3,528,847 | 9/1970 | Grego et al. | 65/30 |
| 2,732,298 | 1/1956 | Stokey | 65/30 |
| 3,429,742 | 2/1969 | Grego et al. | 65/30 |
| 3,495,963 | 2/1970 | Buckley et al. | 65/30 |
| 3,549,344 | 12/1970 | Loukes et al. | 117/124 B |

*Primary Examiner*—David Klein
*Attorney*—Chisholm & Spencer

[57] ABSTRACT

An image plane glass plate used as a mask or template for printing patterns or circuits onto photosensitive material. A portion or zone of the glass plate is made substantially opaque to ultraviolet light by introducing an ion-exchanged zone in a portion including a surface of the glass. Portions of the zone may be then etched away in a circuit pattern, or the zone may take the form of a circuit pattern.

5 Claims, 11 Drawing Figures

INVENTORS

MILTON S. TARNOPOL
ROBERT G. TWELLS, DECEASED
BY DOLORES A. TWELLS, ADMINISTRATRIX
RONALD R. RIGBY

[signature] ATTORNEYS

INVENTORS
MILTON S. TARNOPOL
ROBERT G. TWELLS, DECEASED
BY DOLORES A. TWELLS, ADMINISTRATRIX
RONALD R. RIGBY

Christie, Parker and Hale ATTORNEYS

IMAGE PLANE PLATE

CROSS REFERENCE TO RELATED APPLICATION

This application is a continuation-in-part of copending U.S. application Ser. No. 671,830, filed Sept. 29, 1967, now abandoned.

BACKGROUND OF THE INVENTION

1. Field of the Invention

This invention relates to a stained image plane plate and methods of producing and using such a plate.

2. Description of the Prior Art

One prior-art practice for making printed circuits includes the use of photographic film as a mask for a pattern. This photographic film is applied directly to a photoresist-coated surface of a copper-clad board. The clad-board is exposed to ultraviolet light passing through the photographic film, and the pattern of the circuit is reproduced in the photoresist layer covering the copper-clad plate. These plastic film plates lack dimensional stability during changes of temperature and humidity, as well as simple aging.

Another prior-art method involves the etching of a circuit in a glass plate and the filling in of the etched portions with an ultraviolet-opaque material. This prior-art type of image plane plate is then directly applied to a photoresist-coated surface of a copper-clad circuit board and exposed to ultraviolet light in the same manner as the plastic plate mentioned above. The production of a plane plate that is etched and filled is expensive in view of the fact that it is relatively difficult to apply the conductive material into the grooves. In addition, the plane plate that is etched and filled is subject to rapid deterioration, after repeated use, in the quality and sharpness of the circuit lines. Repeated use of such a plate, in contact with a printed circuit board, makes it necessary to refill the grooves of the pattern, sometimes only after about 75 applications.

Another prior-art practice of making a master involves evaporating a metal, such as chromium, on a surface of the glass, applying a photoresist to the metal coating, subjecting selected portions of the photoresist to ultraviolet light to polymerize exposed portions, removing the unpolymerized photoresist, placing the glass plate in an etchant bath to remove the chromium coating where not protected by the photoresist, and removing the photoresist from the remaining chromium coating. Repeated use of such a coated plate in contact with the printed circuit board damages the chromium coating such that it has a wear life of only about 50 applications.

SUMMARY OF THE INVENTION

A image plane plate is a plate used as a template in the process of printing patterns or circuits on a substrate material. The plate of this invention is a glass sheet of a desired shape and size. Portions of this sheet, including a surface thereof, are treated to provide a thin ultraviolet-opaque zone within the sheet. Any pattern to be printed is then etched or scribed into the surface of the image plane plate so that the ultraviolet-opaque zone is removed in the form of the desired pattern, leaving areas that transmit ultraviolet light. The image plane plate is then used as a pattern or mask which is laid over a copper-clad (or any other electrically conductive material) board which has a photoresist coating thereon. The image plane plate is positioned between an ultraviolet-light source and the copper-clad board, with the stained surface of the image plane plate contacting the copper-clad board. Ultraviolet light is transmitted through the transparent portions of the image plane plate to alter the solubility of a portion of the underlying photoresist material. Solubility can be altered in two ways, depending on whether the photoresist is "positive" or "negative". In the case of a negative photoresist, exposure to ultraviolet light hardens the photoresist by polymerization and the hardened portions become insoluble while the remaining portions remain soluble. In the case of a positive photoresist, the resist is originally insoluble, and the exposure to ultraviolet light makes the exposed portions soluble. After exposure to ultraviolet light, the copper-clad board is placed in a solvent which dissolves the soluble portions of the photoresist coating from the copper. The copper-clad board is then dipped into an etchant bath, and the portion of the copper that is unprotected (by photoresist) is therefore removed. After the copper-clad board is removed from the etchant bath, the insoluble portion of the photoresist is removed from the copper surface, leaving a copper conductor which is in the same form as the circuit pattern of the mask.

This invention relates to an image plane plate made from a piece of flat glass having one surface containing tin ions. This one surface has selected portions which contain a metallic stain which extends within at least a portion of the thickness of the piece. The stain is substantially opaque to ultraviolet light, but transparent to visible light.

The invention also relates to a method of making an image plane plate by producing a piece of flat glass having one surface containing tin ions and introducing a metallic stain that is substantially opaque to ultraviolet light, but transparent to visible light, on selected portions of the surface.

The invention also relates to a method of making a printed pattern. This is accomplished by first producing a plate of glass having selected portions of one surface thereof stained by migration into the glass of metallic ions so as to be substantially opaque to ultraviolet light, but transparent to visible light. The stained surface of the plate is then brought into contact with the surface of a substrate whereon the printed pattern is to be produced. The surface of the substrate contains a coating of a photoresist material which, when exposed to ultraviolet light, has its solubility characteristics altered. Ultraviolet light is then passed to the plate to expose said photoresist material in selected areas and alter the solubility of the photoresist in these areas.

The image plane plate made in accordance with the present invention has a distinct advantage over the prior art plates. The opaque stain of the present invention is an integral part of the durable glass surface, and there is, therefore, no physical degradation as happens with mechanical contact between a circuit board and the metallic coatings of the prior art. Using the image plan plate of this invention, more than 500 circuits may be printed from a single plate.

An additional advantage of the image plane plate made in accordance with the present invention is the fact that the opaque stain absorbs ultraviolet light rather than reflecting it. By absorbing ultraviolet light before it encounters a reflective surface, the stain reduces the possibility of back scatter. Normally, if an image plane plate with a chromium coating, such as taught by the prior art, is used, the ultraviolet light will be reflected off of the chromium coating and will have a tendency to reduce the sharpness of the image produced.

DESCRIPTION OF THE DRAWINGS

A complete understanding of the invention may be obtained from the foregoing and following description thereof, taken together with the appended drawings, which are not to scale, and in which.

DESCRIPTION OF THE PREFERRED EMBODIMENT

The image plane plate of the present invention may be made of plate, sheet, float, or special-compound glass; however, it is important that the glass used contain tin ions adjacent to a surface thereof. Float glass has been found to be particularly desirable as a base material because of the tin ions on the side of the float glass that contacts the molten tin during the float process. An ultraviolet-opaque zone is induced in a portion of the tin-contacted side of the glass, including the surface of that portion, such as by application of a dispersion of silver chromate and titania in an appropriate vehicle, such as squeegee oil, and subsequent heating in an oven. This occurs because the silver ions, in the presence of tin ions, exchange with sodium ions to form a colored stain that is relatively opaque to ultraviolet light, but substantially transparent to visible light.

The stain may be applied to the plate in many ways, such as by spraying, dipping, etc. It is important to note that if the stain is applied to a glass surface that does not contain tin ions, the resulting stain will not be substantially opaque to ultraviolet light unless the staining process is carried on for long periods of time such as, for example, about 3 to 4 hours at about 900°F. A plate so produced is not suited for reproduction of most patterns, even though it only passes about 1 percent of the ultraviolet light, since a long staining time is conducive to the development of a thick stain which inherently yields poor resolution.

Figure 1:
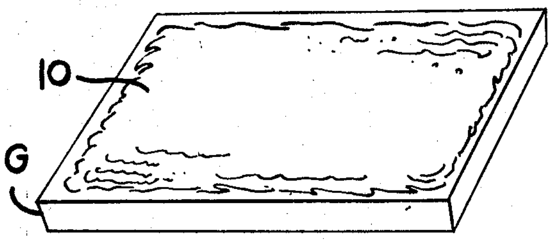
FIG. 1 is a schematic perspective view, showing the application of ion-exchange material to the surface of a glass plate.

Referring to FIG. 1, there is shown a piece of glass G with a silver ion-exchange material 10, such as silver chromate and titania, on the upper surface of glass G. To be more precise, for example, the mixture can comprise about 28 percent silver chromate, by weight, about 52 percent titania, by weight, and about 20 percent squeegee oil, by weight, to form a material of suitable consistency. Using such a mixture, the staining may be done by heating the plate G for about 800°F. to 1,300°F. in furnace 12 for about 3 hours to about 3 minutes, or, to be more specific, for example 900°F. for 2 hours. This procedure sometimes yields small pinholes in the stain. Those skilled in the art will appreciate that the titania is a filler and may be replaced with other materials. Further, other silver compounds may be used in place of the silver chromate, and the time-temperature condition to be used will depend upon the nature of the materials and the depth of stain desired, which is generally on the order of 15 to 75 microns thick. Less stain thickness does not give adequate ultraviolet opacity and more stain thickness tends to cause halation problems and make it difficult to achieve satisfactory resolution, especially if etching is required. Stain thickness may be determined by electron-probe techniques, taking as the thickness of the stain the depth from the surface of the glass at which no silver X-ray counts per 30 second period are obtained.

Figure 2:
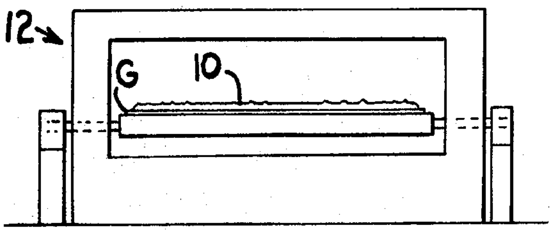
FIG. 2 is a schematic cross-section of a furnace, showing the heating of the plate of FIG. 1.

Referring to FIG. 2, the glass G of FIG. 1 is shown in a furnace 12, where it is heated, for example, to about 1,150°F. for about 7 minutes. The heated glass is air cooled and the "spent coating" is washed from the glass using a sponge and water.

It is also possible to stain the float glass by placing it in a molten bath of about 5 percent silver nitrate and 95 percent sodium nitrate, by weight, at a temperature of about 650°F. to about 950°F. for about 1 hour to about 5 minutes, and preferably at about 850°F. for about 30 minutes. Other silver salts may be used in place of the nitrate, and other alkali-metal compounds may be used in place of the sodium nitrate, the chief consideration being the formation of a compatible, and in most instances non-foaming mixture, that is molten at a desirable treatment temperature. The treatment temperature is selected with appropriate attention being paid to the time required for developing the necessary stain, the silver-compound content of the bath, the nature of the silver compound used, and the need in some instances to keep the treatment temperature low enough to avoid the development of distortion or the unwanted relaxation of glass that has been chemically and/or thermally strengthened.

Figure 3:
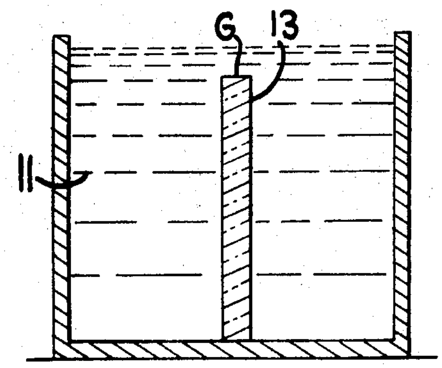
FIG. 3 is a schematic cross-section of a plate of glass immersed in a bath of silver nitrate and sodium nitrate.

FIG. 3 is a schematic cross-section of a piece of glass G immersed in a molten bath 11 of silver nitrate and sodium nitrate. Surface 13 represents the tin-contacted side of the piece of glass G. This bath staining process produces a stain that is more uniform in thickness and opacity than a stain produced by the furnace process described above and illustrated in FIG. 2. In addition, the bath staining process yields a stain that is free of pinholes. This is probably due to the fact that the bath process provides an unlimited supply of silver, since the silver in the bath is never completely depleted. In the furnace staining process, a paste containing silver chromate and titania is applied to the tin-contacted side of a piece of glass G. As the silver in the paste becomes depleted in the area adjacent the tin-contacted side of glass G, the migration of silver ions into glass G is necessarily reduced due to the relatively limited silver supply.

If the piece of glass G is not masked before it is placed in bath 11, all surfaces of the piece will become stained to at least a small extent. However, the surfaces that do not contain tin ions are only weakly stained, and this is easily removed in the etchant bath that is described below.

Figure 4:
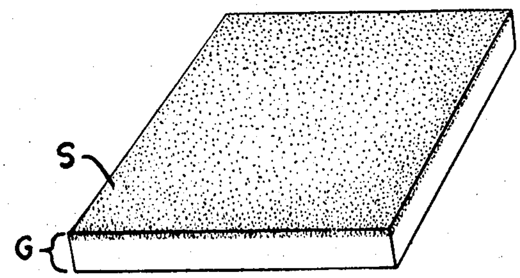
FIG. 4 is a schematic perspective view showing a glass plate having an ultraviolet-light-opaque stain adjacent the top surface thereof.

As shown in FIG. 4, glass treated either with the silver chromate and titanium material, or in the silver nitrate and sodium nitrate bath, is colored with a transparent deep red and uniform stain S having approximately 8 to 18 percent transmission in the visible light range with extremely low or practically zero transmission in the ultraviolet light range. The stain penetrates to a depth of about 15 to 75 microns into the plate G (this dimension has been exaggerated in the drawings for clarity).

The term "optical density" is one that is well known in the art. It refers to the percentage of transmission of the kind of radiation in question. For example, a piece of glass or a film that transmits 100 percent of the radiation in question has an optical density of 0; one that transmits only 10 percent is said to have an optical density of 1; one that transmits only 1 percent is said to have an optical density of 2; and one that transmits only 0.1 percent is said to have an optical density of 3. With respect to image plane plates, which deal with radiation of wave lengths under 5,000 Angstroms, it is preferable (and possible with the present invention) to obtain a stain that has an optical density of 3 or more. There are uses, of course, for which an optical density this great is not required, and for such cases, it is possible to cut down, in a given case, upon the amount of time devoted to development of the silver stain in the molten-salt bath, or upon the amount of silver compound in the bath. For example, when making articles of an ornamental or decorative nature, an optical density of 2 is sufficient.

The optical density of the stained surface may be slightly enhanced by additional heating of the plate to a temperature of about 500°F. in the presence of a forming gas, $SO_2$, or $H_2S$ gas.

These processes induce in the glass a layer or zone of ion-exchanged material at or near the surface. The ion-exchanged zone exhibits reduced (if any at all) transmission of ultraviolet light, as described above.

It is known that glass can be strengthened by exchanging potassium for sodium in the glass. The atomic radius of silver is close in size to that of potassium (silver — 1.26 Angstroms; potassium — 1.33 Angstroms), and silver exchanges for sodium in the glass as does potassium. The increased strengths obtained from silver exchange are similar to those obtained from potassium exchange. Therefore, in addition to the coloring and the ultraviolet-light blocking, the present invention yields a glass piece with increased strength. The strength increase depends on the time and temperature of the treatment, and it ranges from 100 percent to 300 percent. For example, when a piece of glass is heated to 900°F. for 1 hour in furnace 12, the strength will increase from about 10,000 psi to about 40,000 psi. The temperature should be maintained below about 1,000°F. to keep the glass below its strain point.

The exact mechanism that takes place to cause the silver to block ultraviolet light is not known. We have discovered that the migrated tin in the float glass greatly increases the silver's ability to block ultraviolet light. A bath staining treatment of 850°F. for 15 minutes reduces the ultraviolet transmission of float glass treated on the tin side only to less than 1 percent, whereas the ultraviolet transmission of the float glass treated only on the side opposite the tin side, under similar conditions, is about 50 percent. Electron-probe analysis does not indicate an increased concentration of silver in the tin side of the float glass, so it might be assumed that the state of the silver in the glass has changed.

The depth of penetration and the intensity of coloration of the stain depend on the concentration of tin ions and silver ions in the glass. The concentration of silver ions in the glass is a function of the temperature at which the glass is in contact with the silver ions and the length of time of such contact. The following examples further illustrate the invention as described above.

Examples 1 – 15

Samples of float glass of approximately ¼ inch thickness were stained on the tin-contacted side only with the use of the silver chromate plus titania process mentioned above (28 percent silver chromate, 52 percent titania, mixed with 20 percent squeegee oil to give screening consistency, applied to the glass and then baked at the temperature and for the time indicated below in Table I) with the indicated results respecting transmission of visible light, transmission of ultraviolet light, and depth of stain.

TABLE I

SILVER CHROMATE STAINED IMAGE PLANE PLATES

| Ex. No. | Temp. (°F) | Time (Minutes) | Visible Light (%) | Ultraviolet Light (%) | Stain Depth (Microns) |
|---|---|---|---|---|---|
| 1 | 800 | 60 | 36.9 | 4.3 | 32 |
| 2 | 800 | 120 | 25.5 | 1.0 | 44 |
| 3 | 800 | 180 | 17.7 | 0.0 | 72 |
| 4 | 900 | 30 | 14.2 | 0.2 | 40 |
| 5 | 900 | 60 | 9.8 | 0.1 | 64 |
| 6 | 900 | 120 | 8.8 | 0.0 | 104 |
| 7 | 1000 | 10 | 9.9 | 0.0 | 48 |
| 8 | 1000 | 20 | 7.7 | 0.1 | 68 |
| 9 | 1000 | 30 | 8.6 | 0.0 | 80 |
| 10 | 1100 | 3 | 81.9 | 52.8 | 10 |
| 11 | 1100 | 5 | 9.2 | 0.0 | 40 |
| 12 | 1100 | 10 | 10.0 | 0.0 | 64 |
| 13 | 1200 | 3 | 14.9 | 0.1 | 28 |
| 14 | 1200 | 5 | 10.8 | 0.1 | 72 |
| 15 | 1200 | 8 | 17.5 | 0.1 | 108 |

Examples 16 – 19

Samples of float glass of approximately ¼ inch thickness were suitably masked on the tin side in an appropriate pattern and were then immersed in a bath of 5 percent silver nitrate, and 95 percent sodium nitrate for the time and temperature indicated hereinbelow in Table II, with the indicated results in transmission of ultraviolet light and stain depth.

TABLE II

BATH STAINED IMAGE PLANE PLATES

| Ex. No. | Temp. (°F) | Time (Minutes) | Ultraviolet Light (%) | Stain Depth (Microns) |
|---|---|---|---|---|
| 16 | 850 | 15 | 0.4 | 16 |
| 17 | 850 | 30 | 0.2 | 34 |

| | | | | |
|---|---|---|---|---|
| 18 | 850 | 60 | 0.2 | 56 |
| 19 | 850 | 120 | 0.2 | 94 |

It is important to note that while these stains are opaque to ultraviolet light, they remain transparent to visible light. This makes it possible to conduct visual alignment of the image-plane plate with any existing marks or items on the substrate.

Figure 5:
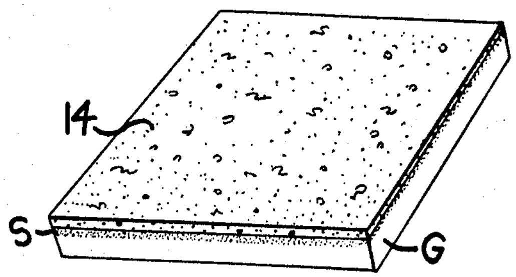
FIG. 5 is a schematic perspective view showing a photoresist coating applied to the glass plate.
Figure 6:
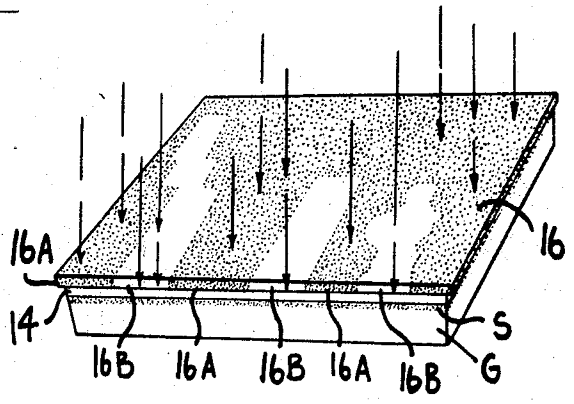
FIG. 6 is a schematic perspective view showing a photographic negative in place on the glass plate.

After staining, the plate is then coated with a photoresist material 14, as shown in perspective in FIG. 5. Any desired circuit pattern or diagram may be transferred into the photoresist-coated glass. This may be done by using a standard photographic negative 16 on a plate G with a photoresist material 14, such as shown in FIg. 6. In the alternative, the pattern may be manually scribed on an etchant resistant coating (not shown, but may be used in place of the photoresist coating 14).

Referring to FIG. 6, there is shown a perspective view of a standard photographic negative 16 in contact with the coating 14 of photoresist material. The negative 16 consists of two portions, namely, 16A and 16B. The area indicated by 16A is that portion of the negative which is opaque to ultraviolet light. The area indicated by 16B is that portion of the negative that will allow ultraviolet light to pass. Therefore, as ultraviolet light, indicated by arrows 18 in FIG. 6, is supplied from above the negative, it will reach the photoresist coating 14 only in the areas immediately beneath portion 16B of the negative.

It is common to use photoresists that are either positive or negative. The photoresist illustrated herein, when exposed to ultraviolet light through the negative, polymerizes in the areas that are reached by the ultraviolet light and hardens, while the unpolymerized portions remain soluble. This is a negative resist and it should be pointed out that positive photoresists may also be used. Positive photoresists become more easily soluble when exposed to ultraviolet light. The known positive photoresists are generally based upon azo-type organic compounds, and are substantially more expensive than negative photoresists. Examples of positive photoresists now commercially available are Shipley AZ111, sold by The Shipley Co. and Kodak KAR, sold by The Eastman Kodak Co. Examples of negative photoresists are Kodak KTFR and Kodak KPR, both sold by The Eastman Kodak Co.

Figure 7:
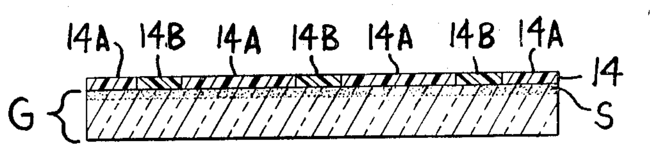
FIG. 7 is a schematic cross-section of the glass plate after the photoresist has been exposed to ultraviolet light through the photographic negative.

Referring to FIG. 7, there is shown a diagrammatic cross-section of the piece of glass G after the negative has been removed. Note that the photoresist coating 14 now comprises material in two different states, namely, 14A and 14B. Portions 14A are those which were previously beneath the opaque portions 16A of the negative and they were therefore unchanged by the ultraviolet-light source. Portions 14B are those portions which were previously beneath portiOns 16B of the negative and they are therefore hardened (rendered insoluble) due to polymerization.

Figure 8:
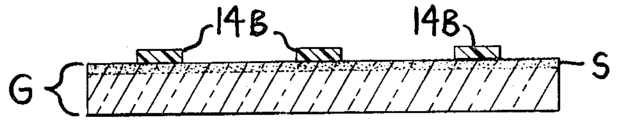
FIG. 8 is a schematic cross-section of the glass plate after the soluble portion of the photoresist coating is washed away.
Figure 9:
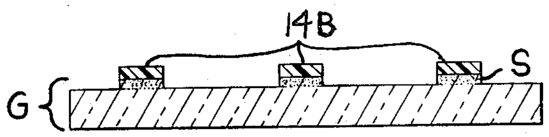
FIG. 9 is a schematic cross-section of the glass plate in FIG. 8 after it has been etched in etching solution.

Referring to FIG. 8, the plate G is shown after the soluble portions 14A of the photoresist material have been washed away, leaving only portions 14B remaining. Soluble portions 14A of the photoresist material may be removed by a proprietary developer made for the specific photoresist. Generally, the piece of glass is immersed in the developer for about 1 to 2½ minutes at 65°–75°F. to remove the soluble photoresist. After the unpolymerized portions are removed, the piece of glass G is immersed in an etching solution to remove the unprotected portions of the opaque stain S. A suitable etching solution is one of concentrated hydrofluoric acid containing about 30 to 60 percent hydrogen fluoride. FIG. 9 shows the piece of glass G after portions of the opaque stain have been removed by the etching solution.

After the etched plate is removed from the etchant bath, portions 14B of the photoresist coating are removed. This may be accomplished by immersing the piece of glass G in a solvent (stronger than the one used to remove the soluble portions 14A) such as acetone for about 5–30 seconds at 65°–75°F.

Figure 10:
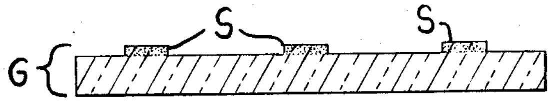
FIG. 10 is a schematic cross-section of a finished image plane plate.

FIG. 10 is a cross-section of a finished image plane plate 30. In those portions of the plate where the opaque stain S has not been removed, the plate is optically dense to ultraviolet light, but passes at least about 10 percent of the visible light. In those portions where the opaque stain S has been etched away, the image plane plate transmits both ultraviolet and visible light. This provides an image plane plate having a hard, durable surface and a resolution of about 500 lines per inch with good acuity in the ultraviolet portions of the light spectrum. The above described process can produce a stain having an optical density of at least about 3, which permits only 0.1 percent of the ultraviolet light to pass. For some purposes, such as producing ornaments, an optical density of 2, which permits 1 percent of the ultraviolet light to pass, is sufficient. The image plane plate 30, so produced, has good sharpness between the opaque and the non-opaque portions.

In the process of manufacturing a printed circuit, a photoresist is applied to a surface of a blank, from which a printed circuit is to be produced. As in the manufacture of the image plane plate, photoresists which are either positive or negative may be used.

Figure 11:
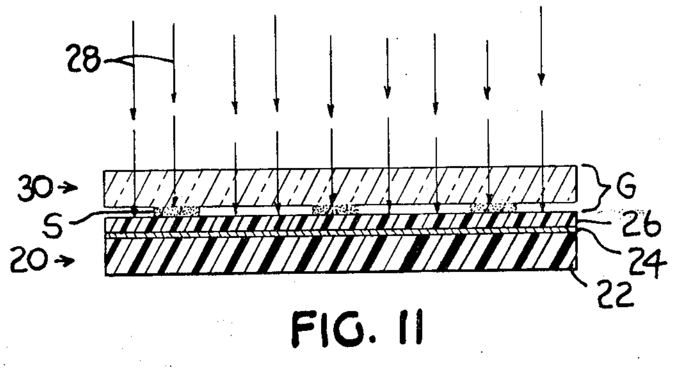
FIG. 11 is a schematic cross-section illustrating the use of the image plane plate as a mask interposed between an ultraviolet-light source and a substrate material to be printed.

Referring to FIG. 11, there is shown the relationship between the finished image plane plate 30 and a blank 20 from which a circuit board is to be produced. Blank 20 consists of a base 22 covered by a copper (or any appropriate electrically conductive material) coating 24 on base 22. A photoresist material 26 is applied to the copper coating 24.

In operation, the pattern is formed in the copper coating 24 by supplying ultraviolet light, such as indicated by the arrows 28, from above the image plane plate 30. The image plane plate allows the ultraviolet light to pass in appropriate areas and this polymerizes or hardens appropriate portions of the photoresist material 26. Soluble portions (unpolymerized portions) of the photoresist are then washed away from the copper-clad circuit board (by a proprietary developer, in the same way that the soluble portion of photoresist is removed from glass G), leaving a covering of photoresist in a pattern on the surface of the coated circuit board. The image in the photoresist material has been determined by the pattern on the image plane plate and results in applying a clearly defined pattern in the photoresist coating. The blank is than placed in a suitable etching solution, such as, for example, ammonium persulphate or nitric acid, which removes portions of the copper coating which are unprotected by photoresist material. The insoluble photoresist material is then stripped away, by a strong solvent, such as acetone, leaving a finished printed circuit of high quality.

The image plane plate of this invention provides a desirable optical density of 3 over the spectrum from 3,000 Angstrom units to 5,000 Angstrom units. For making printed circuits, it is desirable that the image plane plate have an optical density of at least 3 using as thin a stain layer as possible.

It has also been discovered that the image plane plate of this invention greatly reduces the amount of reflected light between the copper circuit board and the metal filled image plane plate, due to the thinness of the present stain. The reflected light in metal filled plates is high, and such reflection produces ragged edges in the lines in the photoresist material covering the copper clad board resulting in ragged lines in the printed circuit.

The image plane plate made by this invention provides a thermally stable, abrasion resistant mask or pattern for repeated use over extended runs, and also produces very accurate lines, with a minimum of distortion.

An image plane plate may be made by another method. A glass plate is cut to any desired size and shape. The plate is either partially or entirely encapsulated in a stain-proof material. The circuit to be printed is then inscribed in a surface of the encapsulating material, thus a pattern is inscribed in the encapsulating material. The encapsulated glass plate is then bathed in the staining solution. The plate is stained in the pattern of the inscribed coating. The stained plate is further heat-treated to cause the desired penetration of the stain into the glass. The stain forms an ultraviolet-light-opaque zone in the glass. When the glass is stained in the pattern of the circuit, the encapsulating material is stripped away, producing an image plane plate having the circuit inscribed in the glass plane plate in a pattern which is an ultraviolet-light-opaque zone. The image plane plate is then contacted to a suitable circuit board blank and interposed between the board and an ultraviolet light source. The process of producing the printed circuit using this image plane plate proceeds as described hereinabove.

We claim as our invention:

1. An image plane plate for printing patterns onto photosensitive material comprising:

a piece of flat glass having one surface containing tin ions, said surface having selected portions which contain a stain of silver, said stain extending to a depth of about 15 to about 75 microns within the thickness of said piece, and said stain strengthening said piece and being transparent to visible light, said stain also being opaque to ultraviolet light to the extent that the stained portions of said piece have an optical density of at least about 3 over the spectrum of from about 3,000 Angstrom units to about 5,000 Angstrom units.

2. A method of making an image plane plate comprising the steps of:

producing a piece of flat glass having one surface containing tin ions, and ion exchanging silver with sodium ions on said one surface of said piece of glass to produce a silver stain that extends between about 15 to 75 microns into selected portions of said one surface, said stain strengthening said piece and being transparent to visible light, but being opaque to ultraviolet light to the extent that said selected portions have an optical density of at least 3 with respect to radiation of wave lengths between about 3,000 Angstrom units and 5,000 Angstrom units.

3. A method of making an image plane plate as defined in claim 2, wherein said silver stain is produced by:

applying a mixture of silver chromate and titania to said one surface, and heating said piece of glass to cause silver ions in the silver chromate to exchange with sodium ions in said piece of glass.

4. A method of making an image plane plate from a piece of flat glass having one surface containing tin ions, which comprises:

applying to selected portions of the tin ion containing surface of the glass a silver containing ion-exchange component; and heating said piece of glass to exchange silver ions from said silver ion-exchange component with sodium ions in said surface so as to stain said surface to a depth of about 15 to 75 microns, said stain strengthening said piece and being transparent to visible light, but being opaque to ultraviolet light to the extent that said selected portions have an optical density of at least about 3 with respect to radiation of wave lengths between about 3,000 Angstroms and 5,000 Angstroms.

5. A method of making an image plane plate as defined in claim 4, wherein said silver containing ion-exchange component comprises a mixture of silver chromate and titania.

* * * * *

UNITED STATES PATENT OFFICE
CERTIFICATE OF CORRECTION

Patent No. 3,732,792 Dated May 15, 1973

Inventor(s) Milton S. Tarnopol, Robert G. Twells and Ronald R. Rigby

It is certified that error appears in the above-identified patent and that said Letters Patent are hereby corrected as shown below:

On the title page, please change the first inventor's name "Milson" to ---Milton---.

On the title page, please change the reference "Stokey" to ---Stookey---.

Signed and sealed this 27th day of November 1973.

(SEAL)
Attest:

EDWARD M.FLETCHER,JR.
Attesting Officer

RENE D. TEGTMEYER
Acting Commissioner of Patents